United States Patent [19]
Elion

[11] Patent Number: 5,205,863
[45] Date of Patent: Apr. 27, 1993

[54] AGRICULTURAL BIODEGRADABLE PLASTICS

[75] Inventor: Glenn R. Elion, Chatham, Mass.

[73] Assignee: International Communications & Energy, Sausalito, Calif.

[21] Appl. No.: 791,721

[22] Filed: Nov. 14, 1991

[51] Int. Cl.$^5$ ............................................... C08L 89/00
[52] U.S. Cl. ................................. 106/154.1; 106/210; 106/211; 106/213; 106/214
[58] Field of Search ..................... 106/154.1, 210, 211, 106/213, 214; 536/110

[56] References Cited

U.S. PATENT DOCUMENTS 2,365,173 12/1944 Caesar .
2,372,337 3/1945 Pacsu et al. .
2,399,455 4/1946 Treadway .
2,507,465 5/1950 Ayers ................................. 106/203
3,281,411 10/1966 Lemmerling .
4,673,438 6/1987 Wittwer et al. ..................... 106/126
4,778,530 10/1988 Ayers ................................. 105/154.1
5,095,054 3/1992 Lay et al. ................................. 524/47

OTHER PUBLICATIONS

Kerr, *Chemistry and Industry of Starch*, Academic Press Inc., N.Y., 1952.

Primary Examiner—David Brunsman
Attorney, Agent, or Firm—Townsend and Townsend

[57] ABSTRACT

Biodegradable starch acetate plastics are synthesized from whole agricultural flours and acetylating agents, without the use of solvents. The process includes a low temperature, staged addition of catalyst to the reactant mixture. The resultant polymers may be blended with other polymers, and biodegradable plasticizers as well as other materials. Plastics with a wide range of colors and physical properties are produced using natural coloring agents, agricultural fillers, and product blending.

23 Claims, 1 Drawing Sheet

AGRICULTURAL BIODEGRADABLE PLASTICS

BACKGROUND OF THE INVENTION

The present invention relates to biodegradable starch acetate polymers, blends, and compositions, and methods for making them.

The term "biodegradable" does not yet have a generally accepted meaning in the plastics industry. Agencies such as the Food & Drug Administration ("FDA") and the Environmental Protection Agency ("EPA") have not, to date, promulgated a test for establishing which products are "biodegradable." In general, the term biodegradable has been applied to any material which is meant to decompose significantly when placed in land fills. Unfortunately, many plastic formulations are said to be biodegradable even when composed of mostly nonbiodegradable oil-based polymers. For example, a formulation of 98% by weight polyethylene and 2% by weight corn starch is called "biodegradable" because over time the corn starch binder will decompose and cause the material to break into smaller pieces or chunks of polyethylene. Unfortunately, the resultant pieces of polyethylene will not biodegrade further. Thus, truly biodegradable plastics that safely decompose into primarily carbon dioxide and water are needed.

The use of oil and hydrocarbon gases as the raw material for plastics has dominated the industry. Substantial amounts of carbon dioxide and other toxic gaseous pollutants are released into the atmosphere during the processing to make these raw materials as well as the ultimate plastic products Further, decomposition by-products of oil and hydrocarbon gas based plastics sometimes contaminate ground water. Thus, environmentally safe plastics and processes for making them from benign starting materials are needed.

Plant-derived products are appropriate starting materials for the desired biodegradable plastics. Agricultural plants and their by-products absorb large amounts of carbon dioxide and release large amounts of oxygen during growth. When decomposed, most of the carbon dioxide and water will be recycled to the earth and atmosphere. Starch based polymers such as starch acetate will biodegrade completely and can be made from natural plant-derived materials. However, their potential as environmentally sound commercial materials has not, until now, been realized.

Earlier attempts to make starch-based plastics employed purified starches (usually corn starch) rather than unprocessed flour Purified starches were preferred because they generally produced whiter plastics having broad market appeal. In some cases, whiteness was enhanced by bleaching flour starting materials with sodium hypochlorite or other agents. Purified starches were also preferred because they do not contain simple or complex sugars such as glucose, sucrose, fructose and, in the case of sweet potatoes, maltose. Under conditions previously employed to make starch acetate, these sugars became dark, turning to a sticky char which spoiled the starch acetate product. Thus, pure starch was not only desirable but required to make useful starch acetate.

Unfortunately, additional processing is required to obtain purified starch from flour. Further, the native starch granule size and hence the number of monomer units in each starch molecule decreases when flour is converted to starch. Thus, polymers made from purified starch generally have low molecular weights and tensile strengths. They have not been suitable for consumer products such as containers or wrappings.

In many prior starch acetate synthesis processes, starch is initially dissolved in a low pH acid solution. The heat given off by this exothermic reaction is so great that a low boiling point solvent is often used to prevent a run away reaction. These solvents may be carcinogenic or otherwise hazardous to use in a manufacturing facility. From a practical standpoint, solvents increase the cost of the overall process and thus the price of the final plastic products. Further, if the reactor temperature exceeds an optimum value for too long, low molecular weight plastics will be formed. Charring and/or decomposition of the raw material are also possible if temperatures remain high for too long.

SUMMARY OF THE INVENTION

The present invention provides a method for producing truly biodegradable plastic materials. The improved novel biodegradable plastic materials and compositions employing these plastic materials are also part of the present invention. The methods of the present invention produce starch acetate polymers of higher quality, and particularly higher molecular weight, than was previously realizable. In this invention, no solvents are used in the synthesis or blending stages of plastic formation. Further, the starting materials are all completely natural or environmentally safe and can be obtained with minimal processing steps.

One aspect of the present invention is a process for converting whole agricultural flour into a high-quality biodegradable starch acetate polymer by combining whole flour with an acetylation agent and subsequently adding a catalyst while the reaction temperature is held between 50° C. and 90° C. Preferably, the catalyst, which may be a common mineral acid, or mixture of mineral acids or methanesulfonic acid, is added gradually over the course of the reaction, i.e., the catalyst addition is "staged." The reactant mixture may be first heated to about 50° C. before adding the catalyst. After the reaction is complete, the starch acetate product may be precipitated by, for example, adding cold water. Typically, the pH of the reactant mixture will be maintained below 1.0 during the reaction.

The starch acetate products produced by this process can be used alone or in combination with other starch or cellulose acetates to form a polymer blend. These materials can be made soft and pliable by the addition of one or more plasticizers, preferably natural, environmentally safe plasticizers In addition, plastic compositions may include natural fillers such as nutshells or mollusk shells. Natural colorants or dyes may also be added to impart pleasing colors to the final material.

A further understanding of the nature and advantages of the invention may be realized by reference to the remaining portions of the specification.

DESCRIPTION OF THE PREFERRED EMBODIMENT

Contents

Figure 1:
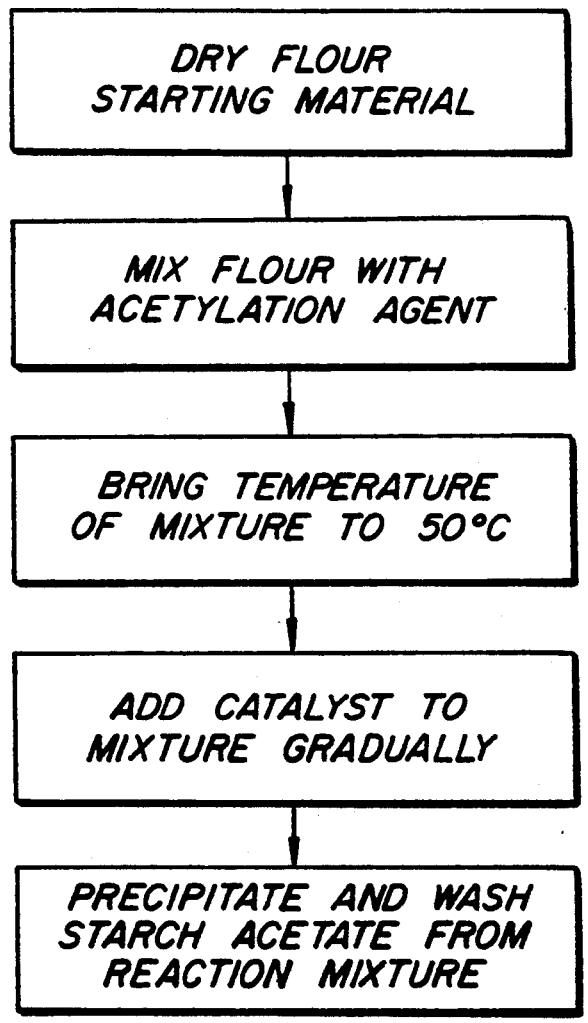
FIG. 1 is a flow chart depicting the process steps employed in a preferred embodiment of the invention.

I. Definitions
II. Flour Starting Materials
III. Reaction Process

A. Catalysts
B. Reaction Temperature
C. Waste Water Treatment
IV. Biodegradable Additives
A. Plasticizers
B. Agricultural Fillers
C. Colorants
V. Examples

I. Definitions

The following definitions are presented to aid in understanding the present invention but are not intended to limit the meaning in the claims. The specific embodiments are only examples within broader classes.

Biodegradable: Although no generally accepted definition of "biodegradable" exists in the art, for purposes of this application, it refers to a material that decomposes over a period of less than about 10-15 years to primarily carbon dioxide and water or minerals commonly found in the environment. Preferably the material will completely decompose in less than about 5 years when buried in soil containing natural microorganisms.

Staged Addition: This describes the gradual addition of a material, such as a catalyst, to another material, such as a reactant mixture, over some period of time. For purposes of this invention, the addition will preferably take place over a period of less than about 10 hours.

Agricultural Filler: A material added to a polymeric material for purposes of altering the properties of the final material. Agricultural fillers are made from materials commonly obtained by traditional farming or harvesting activities. For example, commonly cultivated plant materials such as nuts, berries, corn, and other grains contain waste materials such as shells or husks which can be used as agricultural fillers. In addition to other natural materials, the shells of mollusks or other seafood can be used as agricultural fillers.

Colorant: An inorganic or organic dye, pigment, lake, or other material which when blended with a polymeric material imparts color to the final product.

Acetylation Agent: A compound or mixture of compounds which contain acetyl groups ($CH_3C(O)O-$) available for addition to another compound such as a hydroxyl containing compound. The reaction of an acetylation agent with a hydroxyl containing compound will under the right conditions sometimes yield an acetate.

Solvent-free: A material that contains almost no traditional solvent except for water or low pH acid solution. A solvent-free material will preferably include at most traces of ether solvents, aromatic solvents, nitrogenous base solvents, or other toxic or flammable organic solvent.

II. Flour Starting Materials

The present invention provides a method by which complex, cross-linked, high molecular weight, starch acetates and their associated by-products are produced from one or more of the following agricultural materials: rice flour, potato flour, corn flour, oat flour and wheat flour. When dry, each of these contains a high weight percentage of starch. Almost any common flour commodity can be used to produce biodegradable polymers in accordance with this invention. Preferred flour starting materials, however, will have higher percentages of starch than might be desired for other applications. For example, potatoes can be specifically bred to have high yields of starch and a low amount of sugar and a high amount of total solids. In rice, the amount of starch, sugar and protein can be controlled by using specific fertilizers, and by timing watering and other parameters which can be controlled by the farmer, as well as by breeding.

An important parameter in agriculturally based starches is the ratio of amylose to amylopectin. Amylose is preferred over amylopectin in plastics synthesis since it results in polymers that typically have a higher molecular weight and a corresponding higher tensile strength. In addition, amylose derived plastics are more often colorless. Unfortunately, in most food grade potatoes, the relative amount of amylose is relatively low, and waxy corn can contain almost 100% amylopectin. However, specially bred corn can contain 70% to 80% amylose by weight in the isolated starch.

The starch granule size is another important parameter. Larger granule sizes are generally desired because they provide a higher molecular weight starting material. The molecules of amylose and amylopectin are synthesized from amyloplast enzymes and deposited as starch granules in the root, tuber or grain. The granule size is typically 3 to 8 microns for rice, 8 to 25 microns for corn and 25 to 100 microns for potatoes.

Preferred starting materials include white long grain rice flour and Japonica rice flour both of which have a low sugar and high starch content. In the industry, a premium is sometimes paid for rice with a high protein content. For purposes of this invention, however, the preferred rice will have a low sugar and protein content and the highest possible starch content and starch granule size. Any whole or peeled potato can also be used as a source of flour for this invention. Preferred potatoes will have over 85% starch in the solids content and less than 75% total water content. Potatoes meeting these requirements can be obtained by special breeding. It should be noted that polymers produced from potatoes with peels are sometimes colored brown from the natural pigments in the skin. Suitable corn flour can come from any type of corn including white, yellow or blue varieties. Preferably, the corn is selectively bred for a high amylose content. The wheat flour, likewise, can come from any variety of wheat. The favored wheat flour will come from a "low grade" (or low protein content) wheat that can be obtained from manufacturing plants which grade the wheat by protein and sugar levels. The lowest grade wheat, which has the lowest protein content is preferred in this invention. Although light colored wheat flours are sometimes preferred to give the lightest colored polymer products, any color or shade of wheat can be used, recognizing that the final product color will be affected.

Properties of the final product can be tailored by blending whole flours and isolated starches from potatoes and corn. In a preferred embodiment of this invention, the flours are selected from among a diverse origin of agriculturally based products.

The flour starting material is typically milled to a particle size less than 40 mesh for ease of processing and to accelerate starch dissolution. Smaller particle sizes (down to about a 40 mesh size) allow the material to go into solution faster. Beyond 40 mesh size no improvement in process speed or product quality is realized. In fact, some reduction in the starch granule size may occur if excessive milling is applied to the flour materials. Further, milling to very small particle sizes tends to overheat and damage the starch.

In some previous processes the starch starting material was "activated" by various solvents such as pyridine or treated in other ways. In this invention, however, the only pretreatment is milling the raw material to a flour and then drying the flour to remove residual moisture. Thus, the expense and danger of additional processing is avoided.

As noted, previous processes required purified starch because simple or complex sugars such as glucose, sucrose, maltose and fructose (found in whole flour) quickly become dark and turned to a sticky char. In this invention, sugars can be tolerated and do not have to be isolated prior to reaction. In the polymer washing stage of this invention, residual sugars are dissolved into the cold water and removed from the end product.

In earlier processes, the wash materials often contained chlorites, solvents or other materials having negative environmental effects. In this invention, all waste and wash materials are treated in water lagoons or water aeration tanks to produce a waste stream that can be used for agricultural purposes. In fact, the residual materials are generally safe for spraying onto agricultural lands to grow more crops that might be used to produce more flour starting material.

III. Reaction Process

The major process steps of a preferred embodiment are shown in FIG. 1. To minimize the water content in the reaction solution, the flour is first dried until no further weight loss is observed Preferably, the flours are dried immediately prior to being charged into the reaction vessel. The drying temperature may range between 50 to 90 degrees Centigrade.

Next, one or more of the flours described above are added to acetic anhydride or a mixture of acetic acid and acetic anhydride. Mechanical mixing is required during this step to completely blend the reactant mixtures which often become highly viscous. Typically, the viscosity of the reaction mixture changes as the flour goes into solution and as the starches are converted into acetates.

By using hot water or other heat sources, the temperature of the reaction mixture is brought up to a minimum of 50 degrees Centigrade. This energy will preferably come from nearby waste heat sources. During the entire process, mechanical mixing is continued in order to maintain a uniform reaction composition.

When the reactant mixture reaches 50 degrees, methanesulfonic acid, concentrated sulfuric acid or a mixture of sulfuric and hydrochloric acid or other catalyst blends is slowly added to the reaction mixture over a one to eight hour period During this time the temperature of the reaction mixture is either maintained at 50 degrees or slowly increased to between about 60 and 90 degrees Centigrade.

In a preferred embodiment, the catalyst(s) is mixed with acetic acid prior to being added to the reactor. The acid mixture is then added at a rate to match the acetylation and solution processes to optimize polymer properties and minimize oxidation and other undesired side reactions. Excessive amounts of catalyst or rapid acid catalyst addition causes charring. By mixing the acid catalyst with acetic acid or acetic anhydride, the concentrated acid becomes diluted and thus eliminates the negative effects of decomposition or charring.

In some cases, it may take as long as three to four hours for the starch materials to dissolve. In the case of potato flour which contains peels, complete dissolution will never be achieved during the reaction because the potato peels contain insoluble inerts. If all material does not go into a homogenous solution after four hours, the reaction mixture can be filtered hot to remove undissolved matter. The materials removed can be water washed and spread on to soil to act as a natural soil builder.

It is important to note that each crop and each batch behaves slightly differently. Thus, for example, the time required to completely dissolve the starch and the amount of energy generated by the heats of solution and reaction will sometimes vary from one batch to another. These variations can be accommodated by constantly monitoring the reaction mixture. The most important reaction parameter to be monitored is pH. This determines when all or most of flour has gone into solution. At the critical pH no further homogenous acid or blend of acids is added to the mixture. Thus, the amount of acid required for each run is minimized. Because flours often act as buffers, it is usually easy to control the pH during acetylation. Different blends of flours will, of course, have different buffering properties.

To obtain high molecular weight and high melting temperature agricultural flour acetate polymers the addition of the acid catalyst must be made slowly to prevent excessive oxidation or charring of the flour materials. In practice this is achieved by metering the acid into the reactor over a period of two to four hours. It is vital to add the catalyst and acid mixture at such a rate that no visible signs of darkening are noted as the acid mixes with the flour slurry mixture. The rate is dependent on both time and temperature. Longer addition periods in general lead to higher polymer yields.

For the agricultural flours described herein the weight ratio of acid catalyst to flour is typically in the range of 1:100 to 3:100. The rate of catalyst addition is typically in the range of two to four hours.

Once complete dissolution of the flour is achieved, the reaction mixture may be either precipitated or held at temperatures of 50 to 90 degrees Centigrade for up to eight more hours. The degree of acetyl substitution will depend on type of flour and the reaction conditions. Varying degrees of esterification are achieved by the staged addition of catalyst to a reactant mixture of flour and acetic acid or acetic anhydride. The percent substitution of hydroxyl groups by the acetyl groups in the product can be determined experimentally by the Ost distillation method. With the processes and starting materials of this invention, the acetyl group substitution typically ranges from 30% to 55%. The degree of discoloration in the reaction mixture is a function of the sugar and protein content of the reactant flours as well as the reaction temperature history and the rate of acid catalyst addition.

At the end of the reaction period, the heat source is removed from the reaction mixture. The mixture can then be allowed to cool slowly or rapidly (by, for example, immediately adding cold water). The ratio of reaction mixture to water can range from 1:1 to 1:4 or higher depending on the temperatures of the final reaction mixture. The cooled reaction mixture initially acts as a gel and must be agitated continuously to generate a uniform mixture. Mixing also accelerates precipitation.

In some cases a white to off-white or yellow starch acetate precipitate will form immediately. In other cases (such as with rice flours) precipitation may take place over a span of several minutes to an hour. Separation of the starch acetates from the reaction mixture can be done by direct filtration, the use of settling tanks, or by centrifugation.

Once the precipitate is concentrated from the water solution, it is necessary to wash the plastic to remove any acid residues. This can sometimes best be achieved by the addition of a mild solution of an alkaline compound such as dilute ammonium hydroxide.

A final clean water wash is then employed to remove all water soluble materials including residual alkaline wash, sugars and other water soluble compounds. All wash and waste streams are combined and fed into a staged lagoon system or into aeration tanks. Depending on ambient temperatures, treating the waste water may require three to ten days. For the process to function properly, water temperatures should be kept within the range of 15 to 35 degrees Centigrade. Lime or other basic compounds may be added to the lagoon or aeration tanks to bring the final water pH to a level suitable for agricultural purposes. The pH should preferably be maintained between 4.5 and 6.5.

For the microbial population to be maintained at a high enough level, there must be a sufficient and constant flow of air through the aeration tank reactor or in the aeration lagoon, as well as a constant flow of waste from the manufacturing plant. Residual sugars and other agricultural by-product wastes from the process can maintain a natural microbial population if the temperature and pH are maintained within the ranges specified above.

The washed polymers are dried using any conventional method including spray drying, oven drying or rotary drum drying. Since the polymers are in direct contact with air, drying times should be kept to a minimum.

Once dried, the polymers can then be further blended with other biodegradable plastics or blended with various plasticizers, fillers and coloring agents. Preferred plastics for blending include cellulose acetate and or flour based plastics The blending operation can be done simply by using cold or hot extrusion, rotary powder mixing or other methods common in the art. When pellets are the desired end product, extrusion is convenient because both liquids and solids can be processed and blended using the same equipment.

Preferred fillers include waste nut shell flour, calcium carbonate from mollusk shells or other sources, and dried lobster, crab and shrimp shells. The specific nut shells include, for example, walnut, pecan and pistachio.

Various coloring agents can be added during the final blending process as desired. For plastics materials which may be in direct contact with foods, the seven FD&C colors can be used including red #3, red #40, yellow #5, yellow #6, green #3, blue #1 and blue #2. Natural extracts from agricultural products can also be used including extracts from beets and hibiscus flowers (reds), carrots (yellows to oranges), grape skins (purples and reds), berries (pinks to reds) and whole flours such as potato peels and walnut shells (browns).

Preferred plasticizers include soy bean oil, epoxidized soy bean oil, peanut oil, olive oil, corn oil, walnut oil, safflower oil, sunflower oil, cotton seed oil, glycerin, monoacetin, diacetin, triacetin, sucrose acetate and glucose acetate. Epoxidized soy bean oil is a naturally occurring oil having oxygen atoms incorporated into the long hydrocarbon chains. Glycerin and related compounds may be obtained from natural sources and may have varying degrees of acetyl substitution. The sugar acetate compounds can also contain varying degrees of acetyl substitution. All of the above oils can be used in the hydrogenated form such as a blend of cottonseed oil and soy bean oil commonly known as baking "shortening". The plasticizers which are most compatible with the flour acetate polymers and which give formulated blends the highest physical strength are the glycerine acetates, specifically triacetin, diacetin and monoacetin or blends of these three compounds.

A. Catalysts

In the prior art, a number of catalysts have been used in the esterification of starches. Typically, catalysts were chosen to promote immediate dissolution of the purified starch materials and quick reactions (sometimes less than five minutes). However, the rapid reaction times were accomplished at high acid concentrations and reaction temperatures in excess of 90 degrees Centigrade. The resulting polymers had numerous undesirable properties such as reduced molecular weights, and increased branching resulting from cleavage during synthesis.

Also, by using high concentrations of acids with highly purified starches at high reaction temperatures, a large, difficult to handle exotherm resulted. Further, high concentrations of acids resulted in waste disposal and treatment problems. Those processes using solvents to handle the exotherm required an additional step of removing the solvent from the effluent stream. Most such processes would have difficulty meeting new EPA standards for waste streams from chemical plants.

Some previous methods employed cation exchange resins with sulfonic groups as a substitute for acids. However, when using agriculturally based flours that contain sugars and proteins in addition to starches, both the micro and macro pore structures in the commercial resins quickly plug, rendering them ineffective as catalysts for synthesis of complex starch acetates.

In this invention, low concentrations of homogenous or mixed catalysts are used. The catalysts include methanesulfonic acid, concentrated sulfuric, hydrochloric and phosphoric acids used individually and as blends. Methanesulfonic acid is especially desirable because it biodegrades easily in the lagoon or aeration tank. EPA process licenses are also easier to obtain when methanesulfonic acid is used as the catalyst.

In this invention, the catalyst is introduced into the reaction mixture in a staged or timed manner. In other words, it is added over a period of time instead of all at once, thus eliminating the need for solvents and increasing the product quality by reducing cleavage in the early stages of the acetate or triacetate synthesis.

By maintaining a moderate acid catalyst concentration during acetylation, the charring associated with the use of agricultural flours is minimized. Further improvement can be obtained by using flour blends specially formulated to act as buffers, permitting acetylation to proceed while at the same time preventing excessive side reactions associated with sugars and proteins and excessive oxidation from strong acids.

B. Reaction Temperature

In previous methods, preferred reaction temperatures for starch acetate synthesis were typically in the range of 95 to 105 degrees Centigrade. These temperatures may be appropriate for purified starch starting materials but are too high for whole agricultural flours. Immediate charring of the flours is caused by side reactions with sugars and proteins.

The high temperatures also adversely impacted the molecular weight, flow temperature and other properties of the end product. Thus, the resulting polymers were difficult to mold and extrude. To alleviate these problems, the starch acetate was typically blended with non-biodegradable oil-based polymers. Another disadvantage associated with the high reaction temperature is the need for a heat source near or above the boiling point of water. Steam generation places a high variable cost in the manufacturing plant. This is especially problematic given the trend today toward increased energy costs in plastics manufacturing.

The energy requirement for the present invention can be met by waste heat from refineries or other chemical operations. Thus, the energy cost associated with the primary synthesis is minimal. The reaction temperatures employed in the present invention range from 50 to 90 degrees Centigrade, well within the operational limits of low cost jacketed mixing kettles common in the industry. Further, the blending of polymers and addition of plasticizers can be done at ambient or slightly elevated temperatures without the use of solvents in heated, jacketed extrusion equipment.

C. Waste Water Treatment

To complete this environmentally-sound process, all waste streams generated in the synthesis should be treated appropriately. The use of agricultural flours instead of purified starches presents unique waste stream compositions. The major waste stream components of the present invention are acetic acid, sugars, denatured proteins, methanesulfonic acid, sulfuric acid, and hydrochloric acid. It is possible to recover the acetic acid by various methods including distillation and reverse osmosis. However, some recovery operations are expensive, and alternative processes are sometimes necessary to handle the waste streams. In one approach, the waste water generated from polymer precipitation is treated in staged lagoons or aeration tanks for several days until bacteria can directly act on the acetic acid, converting it to carbon dioxide and water. In most cases, it is necessary to first increase the pH (to approximately 5.0 to 6.5) of the waste water by adding an alkaline material such as lime, quick lime, ammonia, ammonium hydroxide or calcium hydroxide. Then the waste water can be mixed with clean water and sprayed onto agricultural products via irrigation systems.

IV. Biodegradable Additives

A. Plasticizers

A number of plasticizers have been reported for use with starch and cellulose acetates. These have included such materials as dimethyl phthalate, various co-polymers derived from oil processing and other materials which are not biodegradable and which in general are not safe for direct contact with foods under FDA regulations. As noted above, preferred plasticizers for the plastics of this invention include various natural oils and acetate derivatives of natural substances. Each of these is safe and biodegradable.

The purpose of plasticizers are, in general, to make stiff starch acetates more flexible. They accomplish this by lowering the plastic's transition temperature melt viscosity. Thus, the final plastics are more amenable to processing with extruding and molding equipment.

The type of plasticizer used and the weight percent loading in the polymer depend on the processing conditions employed to produce the final plastic article. Processing may include injection molding, extrusion, blow molding, rotational molding, thermoforming and other applications. Each has an optimal pressure ranging from ambient to 40,000 psi, an optimal temperature ranging from ambient to 250 degrees Centigrade, and optimal cycling times ranging from seconds to several minutes.

Plasticizers chosen for use in this invention should be able to withstand these conditions. In addition, they should have a long shelf-life, remaining stable for extended periods of time prior to product use, and be free of any offensive odors. The plasticizers should also be chemically compatible with the selected starch acetate polymer over a variety of conditions including high and low temperature, pressure and pH associated with use and degradation of the end product.

Most natural plasticizers will preferably be present at concentrations of between 5% to 35% by weight of the final starch acetate polymer. To achieve specific plastic properties, various plasticizers may be blended with two or more plastics and natural fillers. For some plasticizers, small incremental changes in the weight percent loading in the plastic blend can cause dramatic differences in tensile strength and flow properties of the polymer.

The concentration of the plasticizer and blend of plastics determines the flow temperature which in turn determines the flow designation as defined in ASTM Test Method D-569. The flow temperature may be further altered by the use of various fillers as described below in the examples.

B. Agricultural Fillers

Fillers are, in general, materials that add bulk, color, or texture to the plastic product and some cases also increase the physical strength Sometimes fillers, especially inexpensive materials, are used to lower the unit cost of the plastic. For example, calcium carbonate is often used with LDPE (Low Density Polyethylene).

In this invention, preferred fillers are whole, dried, agriculturally based flours milled to less than a 80 mesh particle size. Examples of appropriate fillers include various flours made from waste nut shells as well as dried potato skins. Calcium carbonate made by grinding shells from oysters, clams and other mollusks may also be used as a natural filler.

Further, dried lobster, crab, and shrimp shells, which include a blend of chitin, calcium carbonate, red coloring and other materials, are another source of natural fillers. Flours from these shells in general have a low density.

The use of waste nut shells is of particular interest because some of these are inexpensive waste products from shelling operations that add strength to the final polymer blend. For example, strength of pressed polymer disks may increase by as much as 5% to over 30% (as measured by durometer) depending on the particular flour starch blend, the specific plasticizer and the weight loading of the filler flour material. Preferred shell flours include material derived from walnut, pistachio, pecans and other food nut products common in the industry.

Due to the hardness of some of these fillers, milling operations must take place in several steps. In this invention, a preferred method was found to be first crushing the shells to a −10 mesh size followed by successive hammer milling passes of −50 and then −80 mesh. The −80 mesh flours thus obtained have a specific gravity in air as a dried powder ranging from 0.79 to 0.92 grams/cubic centimeter. By comparison calcium carbonate filler has a smaller particle size with a specific gravity ranging from 2.71 to 2.93 grams/cubic centimeter.

Dried agricultural fillers are generally very stable and can be kept for extended periods without spoilage Weight loadings in the final plastics blend depend on the desired physical properties. Weight loading ranges, however, are expected to be in the range of 1% to 15% for most plastics Weight loadings higher than this may adversely affect physical strength and the flow properties of the plastic. Low weight loadings, in general, should increase tensile strength and reduce unit costs of the plastics.

When a coloring agent is added to a blend of a starch acetate and an agricultural fillers, the filler tends to selectively adsorb more of the coloring compound than the bulk plastic or plasticizer. In such cases the filler and the coloring agent may have to be preblended with the plasticizer before mixing with the bulk starch acetate plastic to obtain uniform colors throughout the final product. Alternatively, the filler may also be a coloring agent. Potato peels are one material that serves both as a coloring agent and a filler. Potato peels are a readily available waste associated with most potato processing plants including plants for making french fries, potato flakes, potato flour and other end products. The traditional method of handling these wastes is to spread them over given tracts of land.

C. Plastics Colorization

In the formulation of plastics, many options are available to add color and texture to the final product. For example, calcium carbonate and titanium dioxide are sometimes used to add a white color or opaque quality to certain plastics. Other inorganic and organic pigments and dyes have also been used. When organics are used, they must be able to survive the operating temperatures of the molding or extrusion equipment.

Many inorganic pigments containing metals harmful to the environment have been used. For example, some pigments employ cadmium and mercury to achieve yellows, oranges and reds. Others pigments often employ these and other heavy metals which remain as residues after the material has decomposed or is exposed to acid ground water.

For this invention, most any inorganic pigment can be used, but the preferred compounds are safe to the environment and add to the agricultural viability of the soil. Most any organic pigment or dye can be used, but the preferred compounds are safe for direct contact with foods and can survive processing temperatures as high as 250 degrees Centigrade for at least one minute (conditions, typical in commercial molding and extruding equipment).

The list of safe inorganic and organic dyes and pigments is constantly shrinking as the EPA and FDA find further reason to eliminate various compounds from the approved list. Labeling laws require full listing of FD&C (Food & Drug Cosmetic Act of 1938) colors. Previously, the ingredient could be identified simply as "artificial color". Color compounds which are isolates of extracts found in plants and flowers approved for human consumption are the most preferred safe coloring agents. Included among these are extracts from carrots, beets, grape skins and others. Some starch raw materials contain natural color which appears in the final product as various shades of yellow.

To be used as a coloring agent, the dye or natural agricultural extract is usually mixed with the plasticizer prior to blending. When this is not possible, the coloring agent is mixed and blended in the final preparation of plastic pellets used for manufacturing.

V. Examples

Example 1—Rice Flour

Japonica rice flour milled to −50 mesh was oven dried at 70 degrees Centigrade until no further weight loss from water was measured. This took about 12 hours. 100 grams of the dried flour was charged into a 1000 ml glass vessel with mechanical stirring. 90 cc of acetic anhydride was then added. The mixture was constantly stirred while the temperature was raised to 50 degrees Centigrade over a 30 minute period. Concentrated sulfuric acid (2 cc) was added to glacial acetic acid (88 cc). The acid mixture was then added to the flour and acetic anhydride mixture at a rate of 30 cc/hr for three hours. The reaction temperature was raised at a rate of 10 degrees/hr for three hours. At the end of this time, the flour was completely dissolved.

The reaction temperature was held at 80 degrees Centigrade for three more hours. The solution color was dark brown. At the end of this period, the reaction solution was quenched with 900 cc cold water and mixed for three minutes. The resultant mixture was filtered to recover a dark yellow filtrate and a dark tan precipitate. The precipitate was washed with 500 cc water. Ammonium hydroxide solution was added until the pH reached 5.5. The resulting mixture was then filtered and washed with 150 cc water. The polymer was then dried for 10 hours in an oven at 70 degrees Centigrade. The resultant light tan polymer was milled to pass 50 mesh screen.

To determine the approximate molecular weight and viscosity, 15.0 grams of the resultant polymer was dissolved in a solvent consisting of 8 parts acetone and 1 part methylene chloride by volume. Sufficient solvent was used to obtain a 60 cc solvent/plastic mixture. This liquid was tested in a #1 cup viscometer according to ASTM #D4212, Viscosity By Dip Type Viscosity Cups. Longer time periods correspond to higher molecular weight and/or higher viscosity plastic blends. The solution emptied the cup in 49 seconds. Using the calibrated cup formula of $V = 1.1 (T-29)$ cSt, the fluid viscosity was calculated to be 22 cSt.

To determine tensile strength, the resultant polymer was pressed into disks which were then tested with a durometer. The pressed disks were formed at 150 C under a pressure of about 20,000 psi for one minute. The pressed shape form was a 25 millimeter diameter disk with a thickness of 4 millimeters. At ambient temperature, the disk had a durometer of 57. The Durometer method used is based on ASTM Standard D2240. Using a standard displacement curve, the Durometer reading was divided by 10.0 to obtain the load in pounds. All measurements were taken with the plastic specimen at 21 to 25 degrees Centigrade.

Example 2—Potato Flour

Potato flour was prepared by removing the peels from Russet potatoes and dicing the whole potatoes followed by blanching in hot water for 20 minutes. The diced pieces were then dried in an oven at 60 degrees Centigrade for 24 hours until the moisture content was reduced to below 15%. The potato pieces were then milled to a size to pass a 20 mesh screen. The resultant flour was further oven dried for 12 hours at 70 degrees Centigrade and milled to pass a 50 mesh screen. 60 grams of the flour was added and treated with the same acid volumes and temperatures as in Example 1. The resulting polymer was a light brown. The viscosity as measured in Example 1 was 21 cSt. The pressed disk tensile strength determined as described in Example 1 was a durometer of 63.

Example 3—Sweet Potato Flour

Sweet potato flour was prepared as above except that the peels were left on the potatoes. A white skinned, white fleshed variety was selected with a total sugar content less than 3%, a starch content of 85%, a protein content of less than 2% and a solids content of 24%. The flour was prepared as in Example 2. Following the reaction procedure described in Example 1, a light brown polymer was obtained. The resultant polymer had a viscosity of 22 cSt and a pressed disk durometer of 65.

Example 4—Blue Cornmeal

Blue cornmeal was prepared by oven drying at 70 degrees Centigrade for 12 hours. The flour was then milled to −50 mesh. Using 100 grams of the dried flour, the polymer was prepared as in Example 1 above except that a mixture of 4:1 sulfuric and hydrochloric acid by volume was used in place of concentrated sulfuric acid. The resultant yellow polymer had a solution viscosity of 25 cSt and a pressed disk durometer of 68.

Example 5—Wheat Flour

Red wheat flour was dried and milled as in Example 4 above. The polymer was prepared as in Example 1 above except that a mixture of 3:1 sulfuric acid and phosphoric acid by volume was used in place of concentrated sulfuric acid. The resultant tan polymer had a solution viscosity of 28 cSt and a pressed disk durometer of 70.

Example 6—Rice Flour and Sweet Potato Flour

A blend of rice and sweet potato flours was prepared as in Examples 1 and 3 above. 35 grams of rice flour was used with 25 grams of sweet potato flour. A polymer was prepared as in Example 1 above. The resulting light tan polymer had a solution viscosity of 25 cSt and a pressed disk durometer of 67.

Example 7—Potato Flour and Corn Starch

A blend of potato flour as prepared in Example 2 above and corn starch with a 70% amylose content was used as a starting material. A polymer was prepared as in Example 1 except the temperature was raised 8 degrees/hour for three hours to 74 degrees Centigrade and the reaction time after coming to 74 degrees Centigrade was reduced to two hours. The reaction solution was then quenched with water as in #1 above. The resulting light brown polymer had a solution viscosity of 33 cSt and a pressed disk durometer of 72.

Example 8—Rice Flour and Corn Starch 65 grams of a 2:1 blend of rice flour prepared as in Example 1 and corn starch prepared as in Example 7 was reacted according to the procedure set forth in Example 1. The resulting polymer had a solution viscosity of 69 cSt and a pressed disk durometer of 70.

Example 9—Wheat Flour and Rice Flour 60 grams of a 1:2 blend of wheat flour prepared as in Example 5 and long grain white rice flour was reacted according to the procedure set forth in Example 1. The resulting tan polymer had a solution viscosity of 28 cSt and a pressed disk durometer of 67.

Example 10—Plasticizer and Red Colorization 0.1 cc of a red berry extract was added to 10 grams of triacetin which was in turn added to 50 grams of the plastic powder obtained in Example 4. The mixture was placed in a high speed blender and mixed until a uniform consistency was achieved. The resulting red opaque polymer had a solution viscosity of 26 cSt and a pressed disk durometer of 69.

Example 11—Plasticizer and Orange Colorization

An extract of carrots was selected for use as a coloring agent for the starch acetate produced in Example 6 above. 0.1 cc of the extract was added to 8 grams of glucose acetate and 50 grams of the plastic blend powder. The mixture was blended as in Example 10. The resultant material had a solution viscosity was 24 cSt. A bright orange, opaque pressed disk was prepared that had a durometer of 68.

Example 12—Plasticizer and Filler 50 gm of the starch acetate produced from Example 2 above was mixed with 2 gm of lobster shell flour and 15 gm of monoacetin. The mixture was blended in a high speed mixer. The resulting material had a solution viscosity of 38 cSt. pressed disk of the material was light pink to light red and had a durometer was 72.

Example 13—Blends

Blends of the materials prepared above were made by addition to a high speed mixer and blending for 30 seconds. The resultant materials were tested for melting point ranges using a capillary tube and then pressed into disks as described above. Some relevant properties of the resulting compositions are presented below.

A. Potato flour acetate 3.5 gm + Triacetin 0.5 gm
  M.P. Range 165°–192° C.;
  Durometer 63.
B. Yellow corn flour acetate 3.4 gm + Triacetin 0.6 gm
  M.P. Range 159°–186° C.;
  Durometer 57.
C. White rice flour acetate 3.6 gm + Monoacetin 0.4 gm
  M.P. Range 149°–179° C.;
  Durometer 48.

Example 14—Blends

Blends of the materials prepared above were made by the dry mixing of powders in a rotary drum. The blended uniform powders were then added to a high speed mixer with a plasticizer and mixed for one minute. The resultant materials were tested for melting point ranges using capillary tubes and then pressed into the disks as described above. Some relevant properties of the resulting compositions are presented below.

A. Potato flour acetate 2.0 gm + Shrimp shell flour 1.0 gm + cellulose acetate 1.0 gm.
  M.P. Range 150°–180° C.
  Durometer 45
B. Potato flour acetate 1.0 gm + Shrimp shell flour 0.8 gm + monoacetin 1.2 gm + cellulose acetate 1.0 gm.
  M.P. Range 151°–161° C.
  Durometer 48
C. Shrimp shell flour 0.8 gm + Pistachio shell flour 0.4 gm + monoacetin 1.2 gm + cellulose acetate 1.6 gm.
  M.P. Range 163°–182° C.
  Durometer 60.

The materials produced in accordance with this invention are truly biodegradable as shown in the following example. When buried, they will biodegrade to primarily water, carbon dioxide and other natural materials, such as crab shell flour which may be present as a filler. Yet they do not degrade so fast that they cannot be used as wrappings for food or throw-away containers, for example. Further, it has been observed that mold does not readily grow on these material, unlike some other "biodegradable" materials.

Example 15—Biodegradation

Pressed disks prepared as described in the above examples were buried in five gallon plastic containers filled with different soil compositions ranging from sand to top soil to clays and various other mixtures expected to be present in different locations. Every land fill has a different set of soil and weather conditions as well as a changing set of microorganisms. Thus, these soil tests are relative not absolute.

The pressed disks were buried at depths ranging from two centimeters to 25 centimeters. Each month the disks are removed from the soil and weighed and then replaced in the same location. Water was randomly added to the containers to simulate occasional rain fall. In addition to the pressed disks, samples of other "biodegradable plastics" were put into the soils as controls.

It was found that typical formulations given in the above examples showed a weight loss range of about 5% to 10% a month during the first six month period. Samples of the other "control" materials including polyethylene doped with corn starch showed no visible degradation over the same period under the same conditions. Further, some samples of corn starch/polyethylene blends actually gained weight, presumably due to water adsorption.

By observing the disks under the microscope and measuring the melting point ranges of the plastics as they degrade, it is observed that the plasticizer usually degrades at the fastest rate in the blends, followed by the flour acetate and fillers, followed in turn by the cellulose acetate if any was present in the formulation.

Example 16—Methane Sulfonic Acid Catalyst

Unsweet potato flour of the variety Ivoire, was oven dried at 80° C. for 48 hours. 200 grams of the dried flour was charged into a 4,000 ml beaker with a magnetic stirrer. 300 cc of acetic acid was then added. The mixture was constantly stirred while the temperature was raised to 60° C. over a 60 minute period. Methane sulfonic acid (6 grams) was added to acetic anhydride (200 cc) and stirred in a 500 ml beaker. This mixture was added to the flour and acetic acid mixture at a rate of 51 cc/hr for four hours. The reaction temperature was raised at a rate of 7° per hour for four hours, at which time the temperature was 88° C. This mixture was allowed to continue to react for an additional three hours at 88° C. At the end of this time the flour was completely dissolved.

The solution at the end of the reaction was dark brown. At the end of this period, the reaction solution was quenched using 1,500 ml of ice water and mixed for an additional hour. The resultant mixture was filtered, water washed and ammonia washed as in Example 1. The resultant Unsweet potato starch acetate polymer was tan in color. Upon oven drying the final yield was about 265 grams of plastic powder. The viscosity as measured in Example 1 was 34 cSt. The pressed disk tensile strength determined as described in Example 1 was a durometer of 63.

The waste liquids were all collected and placed into a plastic tank with aeration. After a seven day period, there were no traces of the methane sulfonic acid or sugar byproducts from the potatoes. Based on the standard OECD 301D Closed Bottle Test and standard BOD Testing, methane sulfonic acid is considered readily biodegradable which offers advantages over sulfuric acid and other esterification catalysts such as PTSA (para-toluenesulfonic acid).

The present invention has now been described in terms of preferred embodiments. As many modifications to the present invention can be envisioned without departing from the essential nature of the invention the appended claims, which define the invention, should be read in a broad, inclusive sense.

What is claimed is:

1. A process for converting a whole agricultural flour into biodegradable starch acetate polymers comprising the following steps:
    combining the whole flour with an acetylation agent to form a organic solvent-free reactant mixture; and
    adding a catalyst to the reactant mixture to form a reaction mixture, wherein the temperature of said reaction mixture is held between 50 and 90 degrees Centigrade.

2. The process of claim 1 wherein the step of adding the catalyst is staged.

3. The process of claim 2 wherein the catalyst is added over a period of less than about 9 hours and more than about 0.5 hour.

4. The process of claim 3 wherein the temperature of said reaction is gradually increased over the period during which the catalyst is added.

5. The process of claim 1 wherein the catalyst is selected from the group consisting of methanesulfonic acid, sulfuric acid, hydrochloric acid, and phosphoric acid.

6. The process of claim 1 wherein the catalyst is a mixture of hydrochloric and sulfuric acid.

7. The process of claim 1 wherein the flour is selected from the group consisting of rice flour, potato flour, corn flour, oat flour and wheat flour.

8. The process of claim 1 wherein the catalyst is combined with acetic acid before the catalyst is added to the reactant mixture.

9. The process of claim 1 wherein the acetylation agent is a mixture of acetic acid and acetic anhydride.

10. A process of synthesizing a biodegradable starch acetate polymer comprising:
    selecting a whole flour comprising starch that includes at least about 70% amylose;
    combining said flour with an acetylation agent to form a reactant mixture;
    heating said reactant mixture to at least about 50° C.;
    performing a staged addition of catalyst to said reactant mixture; and
    precipitating the starch acetate.

11. The process of claim 10 further comprising a step of washing the starch acetate.

12. A composition comprising a biodegradable starch acetate polymer produced according to the process of comprising the steps: combining the whole flour with an acetylation agent to form a substantially organic solvent-free reactant mixture, and adding a catalyst to the reactant mixture to form a reaction mixture, wherein the temperature of said reaction mixture is held between 50 and 90 degrees Centigrade.

13. The composition of claim 12 wherein said starch acetate polymer has a tensile strength based on the durometer method of at least about 50.

14. The composition of claim 12 further comprising a plasticizer.

15. The composition of claim 14 wherein the plasticizer is selected from the group consisting of vegetable oils, acetins, glycerine, sucrose acetate, and glucose acetate.

16. The composition of claim 12 further comprising an agricultural filler.

17. The composition of claim 16 wherein said filler is selected from the group consisting of nut shells, mollusk shells, lobster shells, shrimp shells, and crab shell flour.

18. The composition of claim 16 wherein said agricultural filler is potato peel flour.

19. The composition of claim 12 wherein said starch acetate polymer is made from a whole flour comprising starch that includes at least about 50% amylose.

20. The composition of claim 12 further comprising a colorant.

21. The composition of claim 20 wherein the colorant is selected from the group comprising FD&C approved color dyes, FD&C approved lakes, and FD&C approved pigments.

22. The composition of claim 20 where the colorant is natural color extracts or dyes.

23. The composition of claim 21 wherein the source of the natural color extract or dye is selected from the group consisting of grape skins, carrots, and beets.

* * * * *